March 6, 1928.  
C. A. JOHNSON  
CARPENTER'S PLANE  
Filed Jan. 23. 1926
1,662,005
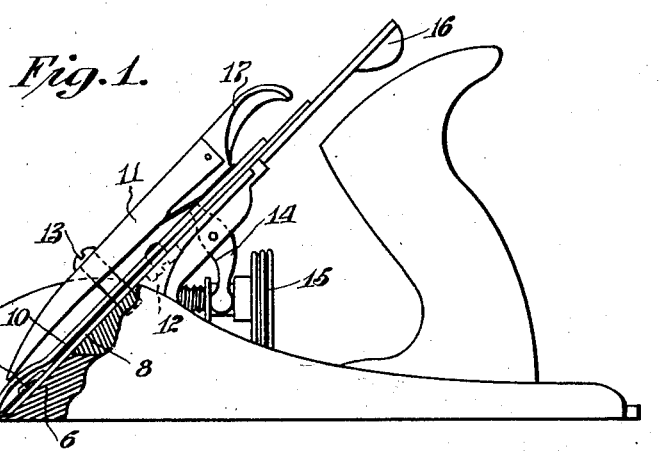
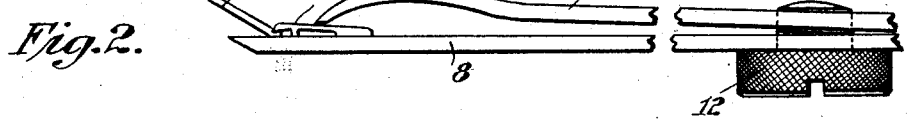
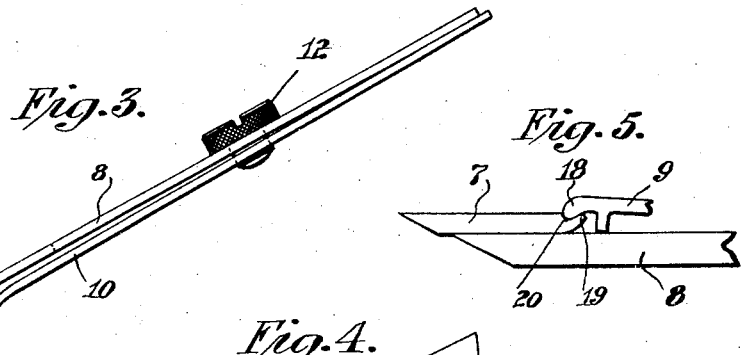
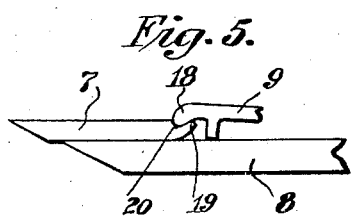
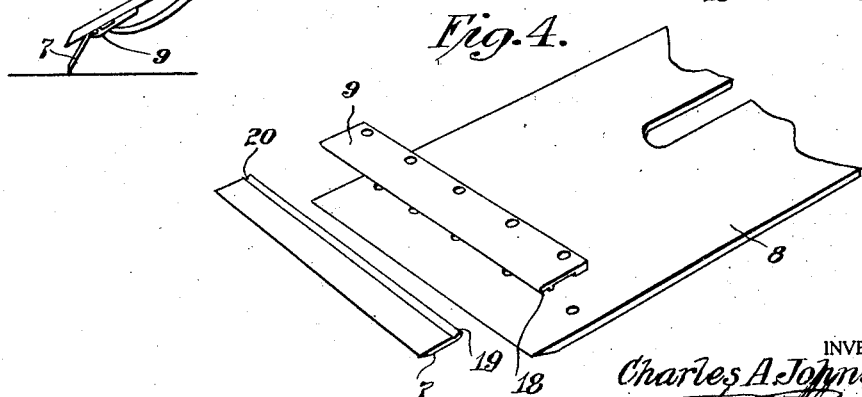
INVENTOR  
Charles A. Johnson  
BY  
ATTORNEY Patented Mar. 6, 1928.

1,662,005

UNITED STATES PATENT OFFICE.

CHARLES A. JOHNSON, OF UNIONVILLE, CONNECTICUT, ASSIGNOR TO THE STANLEY WORKS, OF NEW BRITAIN, CONNECTICUT, A CORPORATION OF CONNECTICUT.

CARPENTER'S PLANE.

Application filed January 23, 1926. Serial No. 83,217.

My invention relates particularly to the cutter part of the plane.

The main object is to provide a simple, inexpensive and reliable construction employing a narrow blade. Great difficulty has been found in such constructions in producing a uniform and reliable construction which is rigid and yet which can be readily assembled and adjusted.

These difficulties I have overcome by constructing the cutter and its supporting iron or plate with coacting hinge-like parts which can be interlocked with a cam-like action. The particular form shown is so constructed that it can be used in any ordinary plane.

Fig. 1 is a side view and partial section of one form of plane utilizing my invention.

Fig. 2 is an edge view (enlarged) of the plane iron or plate with the cutter about to be detached.

Fig. 3 is an edge view showing the cutter about to be secured to the plate.

Fig. 4 is a perspective view of the plate and cutter members.

Fig. 5 is an edge (much enlarged) showing the cutter attached to the plate.

The body 5 is intended as illustrative of any suitable plane with or without handles and having some sort of inclined wall 6 either integral with or separate from the body for supporting the plane iron or plate.

The cutter 7 is of a suitable hardened and tempered steel very thin and quite shallow. It can be made from narrow strip steel so as to be as cheap as possible.

The plate or iron 8 may be of any suitable iron or steel as it need not be hardened. This plate has a hinge member 9 which may be integral with it or welded or riveted in place.

The clamp plate 10 and the cap member 11 are of the usual type. The plates 8 and 10 may be held together as usual by a screw 12 and the cap screw 13 may hold the parts to the body of the plane.

In the form shown the cutting depth is adjustable by a fork 14 and screw 15 and the cutter may be tilted by the usual lever 16. The thumb cam 17 may be used to clamp the parts in place as is usual in planes of this type.

The hinge plate 9 is provided with a cam-like rib 18 spaced apart from the adjacent surface of the plate 8. The cutter is thinned at 19 at the upper edge so that it can be readily slipped in between the rib 18 and the plate 8 as shown in Fig. 3. A groove 20 is provided and adapted to fit the rib 18 when the parts are forced together.

A convenient way to assemble the parts is to insert the upper edge of the cutter beneath the hinge member as shown in Fig. 3 and press downward and at the same time draw the plates and cutter toward the right as viewed in Fig. 3.

This wedges the cutter in place after which the plate 10 is slid along beneath the plate 8 until the lower end of the plate 10 engages the cutter. The screw 12 is then tightened and the cutter and plates are ready to insert in the plane body.

To remove the cutter when it is dull or broken the plate 10 is slid along to the position of Fig. 2. The cutter 7 may then be tilted up about the hinge members and readily removed.

The cutter is so small and simple that it can be made very cheaply and thrown away when dull. The parts are designed so that the cutter is securely held against vibration and yet can be readily replaced when desired. Although the cutter is very thin it is reinforced by the holder plate and the cap plate.

I claim:

1. As an article of manufacture, a narrow plane cutter having its upper edge portion shaped for hinged engagement with a plane iron.

2. In a plane, a plate member, a hinge member carried thereby, a narrow cutter member having a thinned edge adapted to be inserted beneath said hinge member, said members having coacting wedging surfaces adapted to hold the members in their relative operative positions when they are forced together by a hinge action.

3. A narrow cutter having a groove at its upper edge, a supporting plate having a rib adapted to interlock with said groove and means coacting with said cutter near its down edge for holding it in place on said plate.

4. In a plane, a body, a plate mounted in said body, a narrow cutter hingedly engaged adjacent its upper edge to said plate, means for clamping the cutter against the lower portion of said plate so that its lower surface lies flat against the upper surface of said plate, and thereby maintaining its entire surface in contact therewith, and means for clamping said plate and cutter to said body.

5. As an article of manufacture, a narrow plane cutter sharpened at its lower edge and wedge shaped at its upper edge and provided with a groove to receive a supporting rib about which the cutter rocks bodily on engagement.

6. In a plane, a plate member, a hinge member carried thereby, a narrow cutter member having an edge adapted to be inserted beneath said hinge member, said members having coacting wedging surfaces adapted to hold the members in their relative operative positions when they are forced together by a hinge action and a cap for holding said parts in position.

7. A narrow cutter having a groove and thinned at its upper edge, a supporting plate having a rib adapted to interlock with said groove and slidable means coacting with said cutter near its lower edge for holding it in place on the said plate.

8. In a plane, a body, a plate mounted in said body, a narrow cutter detachably and hingedly engaged to said plate so as to rock bodily, means for clamping at least a part of said cutter against said plate and means for clamping said plate and cutter to said body.

9. In a plane, the combination with a supporting plate, of a detachable cutter, and connecting means therefor, fixed with respect to said plate, extending around the upper end of said cutter, the connecting means and cutter being shaped to engage both to clamp the cutter in operative position and to function as an abutment for the prevention of upward movement of said cutter relative to the plate.

10. In a plane, the combination with a supporting plate, of a detachable cutter, and connecting means therefor, fixed with respect to said plate, adjacent its lower end portion and comprising a rounded projection extending transversely of the plate and downward toward the cutter, oppositely inclined surfaces being formed on the upper surface of said cutter and between which the projection extends and engages for holding the cutter in operative position.

11. In a plane, the combination with a supporting plate, of a detachable cutter, means for substantially rigidly clamping the upper edge of the cutter in operative position with respect to the plate, said securing means being constructed to permit engagement and disengagement of said cutter on bodily rotation of the cutter relative to the plate about an axis adjacent the upper edge of the cutter, and transverse of the plate.

CHARLES A. JOHNSON.